May 27, 1941.  F. D. HOWE ET AL  2,243,156
POWER PLANT
Filed Aug. 31, 1939  3 Sheets-Sheet 1

FRANK D. HOWE INVENTORS
JOHN RIISE
BY
ATTORNEY

May 27, 1941. F. D. HOWE ET AL 2,243,156
POWER PLANT
Filed Aug. 31, 1939  3 Sheets-Sheet 2

FRANK D. HOWE  INVENTORS
JOHN RIISE
BY
ATTORNEY.

FRANK D. HOWE — INVENTORS
JOHN RIISE
BY
ATTORNEY.

Patented May 27, 1941

2,243,156

UNITED STATES PATENT OFFICE 2,243,156

POWER PLANT

Frank D. Howe, Cuyahoga Falls, and John Riise, Doylestown, Ohio

Application August 31, 1939, Serial No. 292,884

15 Claims. (Cl. 60—97)

The object of this invention is to produce a power plant in which a plurality of prime movers drive a plurality of driven units, so that any prime mover may be substituted for or combined with any or all of the other prime movers to selectively drive any or all of the driven units.

In many operations, such as well drilling, the power requirements of the individual driven units varies greatly from time to time and it is also important that operation be continuous. In such cases a plurality of prime movers is commonly used and their power combined or distributed as required. It is desirable that each prime mover be able to drive selectively any or all of the driven units and that it be able to be substituted for or to be combined with any or all of the other prime movers, or to be held idle in reserve, and that the driven units may be simultaneously driven at different speeds.

The specific object of this invention is to provide three engines and two or more driven units, and to so devise the jackshafts that any one of the three engines can drive any one or more of the two or more driven units, and each engine can be combined with either one or the other two engines or with both, or can be held idle.

Another specific object is to provide four engines and two or more driven units and to so devise the jackshafts that any one of the four engines can drive any one or more of the two or more driven units and each engine can be combined with one, two or three of the other three engines, or with any two or all, or can be held idle.

The method which we use to accomplish these results with three or more motors is as follows:

We provide a jackshaft having two independent sections each having clutch controlled driving connection to any or all of the driven units, two prime movers each having clutch controlled driving connection to one of the jackshaft sections and one or more additional prime movers each having clutch controlled driving connections with both of said jackshaft sections, so that the additional prime movers may be connected with either or both of the jackshaft sections.

In the drawings we show a number of embodiments of our invention, the arrangements being such as would be used in well drilling.

Figures 1, 2:
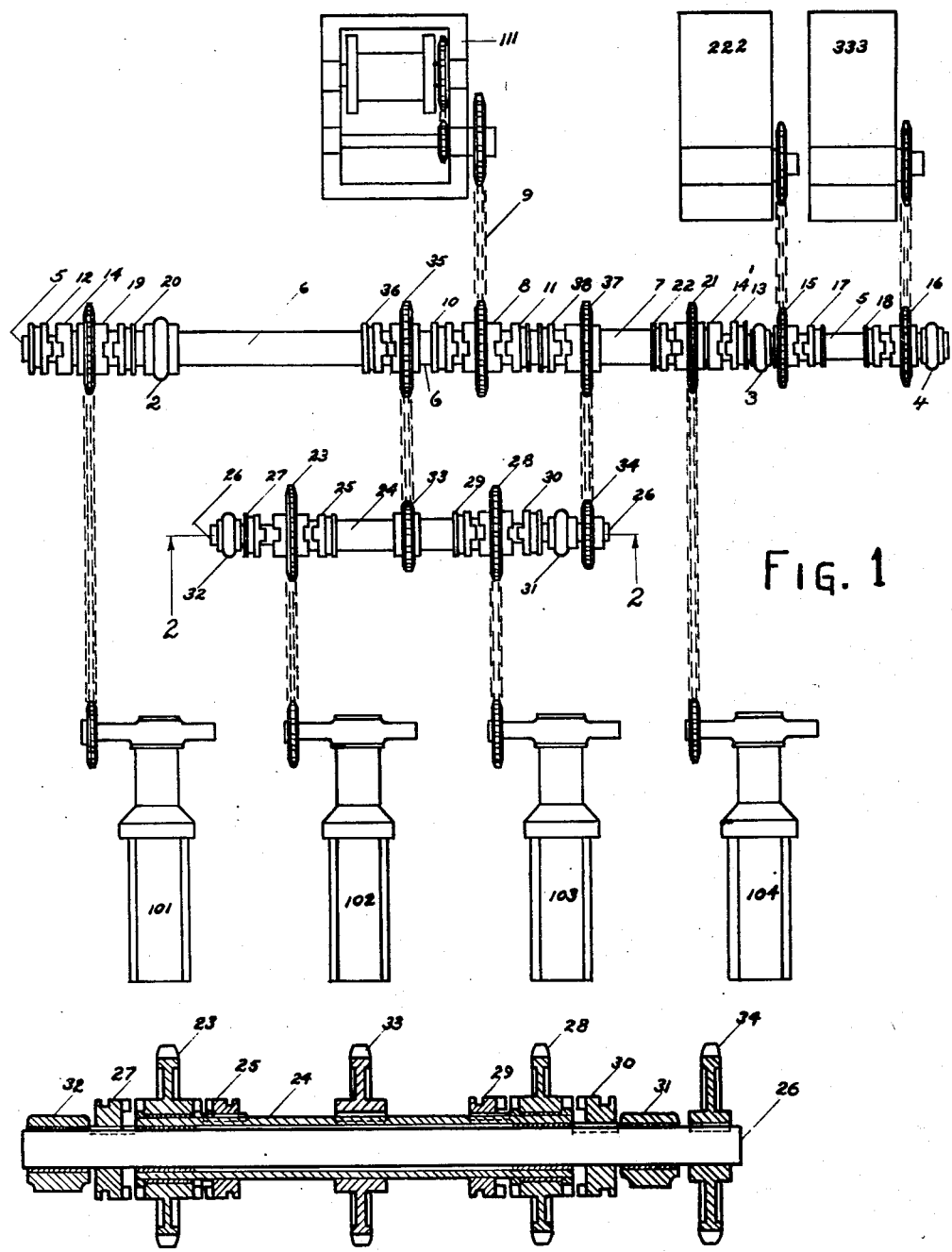
Fig. 1 shows a plan view of a four engine power plant in which two of the engines drive through a separate countershaft to a countershaft to which all four power plants are connected.
Fig. 2 shows an enlarged cross sectional elevation of the countershaft taken on plane 2—2 of Fig. 1.

In Fig. 1, 101, 102, 103 and 104 are prime movers, shown as internal combustion engines of a type commonly used in well drilling.

The power of these engines is distributed through a jackshaft, the essential parts of which are an inner shaft 5 and freely revolving sleeve sections 6 and 7 mounted thereon. Between sleeves 6 and 7 and freely rotatable on shaft 5 is a sprocket 8 having driving connection 9 to driven unit 111. Clutch 10 may connect sprocket 8 to sleeve 6 and clutch 11 may connect it to sleeve 7. Sleeve 6 may be connected with shaft 5 by means of clutch 12 and sleeve 7 to shaft 5 by clutch 13. Coacting clutch members 14 and 14' are keyed to the sleeves 6 and 7 respectively. Sprocket 15 (driven unit 222) and sprocket 16 (driven unit 333) are freely mounted on shaft 5 and can be put in driving connection with it by means of clutches 17 and 18. Bearings 2, 3 and 4 support the shafts 5, 6 and 7.

So much of the jackshaft is old and is not claimed, but is used illustratively as one form of jackshaft to which our invention may be applied and in which the sleeves perform the function of the jackshaft sections herein specified.

Engine 101 (Fig. 1) has a driving connection with a sprocket and clutch element 19 which is mounted in free rotation on sleeve 6 and can be connected to the sleeve by means of a clutch 20 which is keyed to sleeve 6.

Engine 104 has a driving connection with sprocket 21 and the clutch element integral therewith rotating freely on sleeve 7 and adapted to be placed in driving connection therewith by means of a clutch 22.

Engine 102 has a driving connection with sprocket 23 which is mounted so as to freely rotate on an intermediate countershaft sleeve 24 and is adapted to be placed in driving connection therewith by means of clutch 25. Sprocket 23 may be selectively connected to an inner shaft 26 by means of clutch 27, or by means of clutch 25 to the sleeve 24.

Engine 103 drives a sprocket 28 mounted in free rotation on the sleeve 24 and connected to sleeve 24 by means of clutch 29 and to shaft 26 by clutch 30.

Shaft 26 is carried in bearings 31 and 32 which are suitably supported and has sprocket 34 keyed upon the right hand end, (Fig. 2). Sleeve 24 has sprocket 33 keyed upon it which drives sprocket 35, mounted freely on sleeve 6 and adapted to be connected to it by a clutch 36. Sprocket 34, on the intermediate countershaft, drives sprocket 37 mounted in free rotation on the main countershaft upon sleeve 7 and is adapted to be connected to it by clutch 38.

Figure 3:
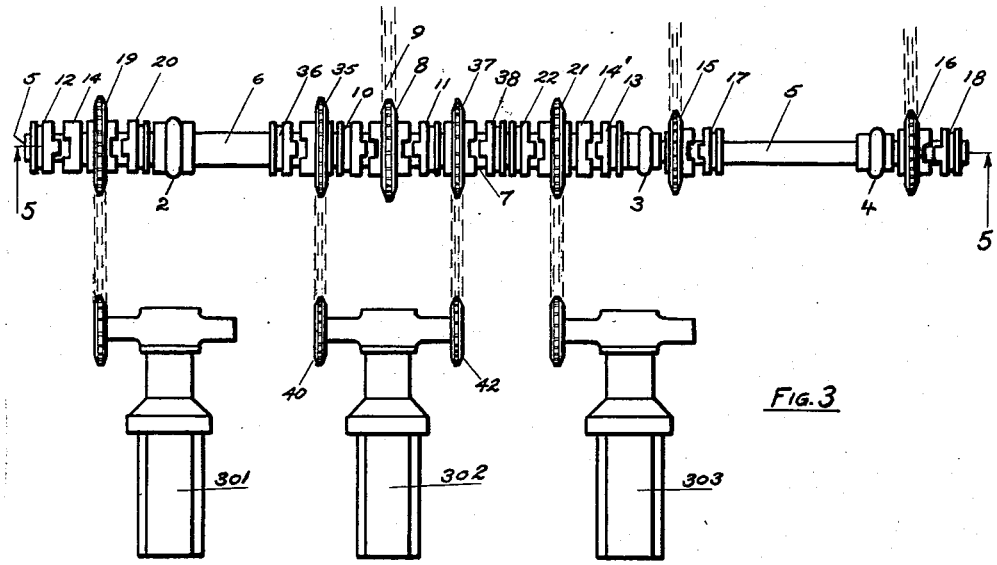
Fig. 3 shows a three engine power plant with direct drive to the jackshaft.

Almost the same flexibility can be obtained with three power plants as with four and without the intermediate countershaft. This is shown in Fig. 3, in which engines 301 and 303 are shown connected to the jackshaft in the same way as are engines 101 and 104 in Fig. 1. Engine 302, however, has two driving sprockets 40 and 42 with driving connection to sprockets 35 and 37; clutch connections are similar to those shown in Fig. 1. The jackshaft is identical with that in Fig. 1.

Figure 4:
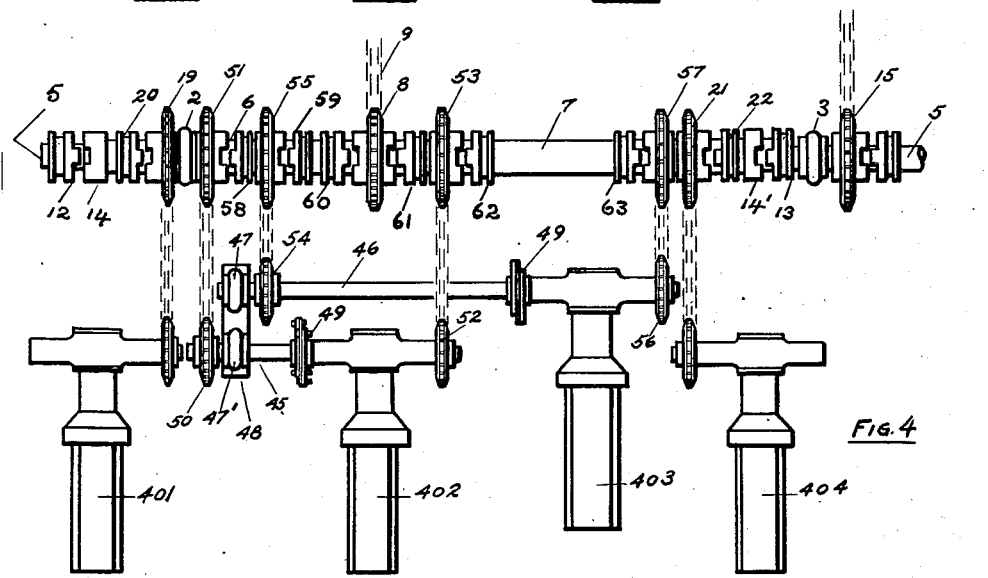
Fig. 4 shows a four engine power plant with direct drive from each engine to the jackshaft.

In Fig. 4, engines 401 and 404 have the same connection to the jackshaft as do engines 101 and 104 in Fig. 1. Engine 402 drives through sprocket 50 to sprocket 51 on sleeve 6 and through sprocket 52 to sprocket 53 on sleeve 7. Engine 403 drives through sprocket 54 to sprocket 55 on sleeve 6. Sprockets 51, 53, 55, and 57 are mounted freely on their respective sleeves to which they may be clutched by clutches 58, 59, 60, 61, 62, 63. Engine 403 drives sprocket 57 through sprocket 56.

It is evident that the principle of Fig. 4 is the same as that of Fig. 3 and that two extra sprockets 51 and 57 are added to the jackshaft to take the drive of the fourth engine. Engine shaft extensions 45 and 46 may be necessary, the outer ends of which are journalled in adjustable bearings 47, 47' mounted on base 48. Flexible joints 49 may be used to avoid extreme care in alinement of the bearings 47 and 47'.

Figure 5:
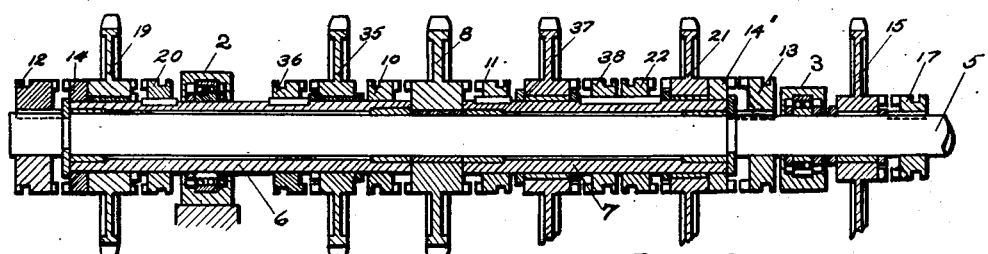
Fig. 5 is an enlarged sectional elevation of the jackshaft taken on plane 5—5 of Fig. 3.

Fig. 5 shows in enlarged section the jackshaft as used for Figs. 1 and 3. The jackshaft in Fig. 4 is the same except for the two additional sprockets 51 and 57.

Figure 6:
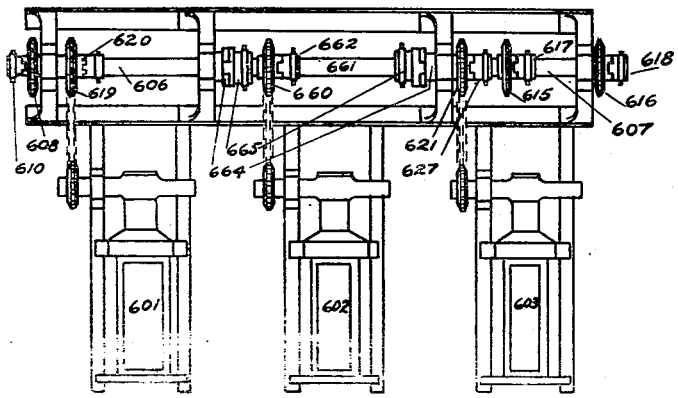
Fig. 6 shows a plan view of a three engine power plant having two jackshaft sections connected by an intermediate shaft.

In Fig. 6, the two jackshaft sections are independent shafts 606 and 607 in approximate axial alinement. An intermediate shaft 661 supported by and journalled upon the jackshaft sections has clutch connections 664 and 665 with each of them. The clutch jaws may have clearance to accommodate misalinement of the shafts.

Engine 601 has driving connection with sprocket 619 mounted in free rotation upon shaft 606 and connected to it by clutch 620. Engine 603 has driving connection with sprocket 621 mounted freely upon shaft 607 and connected to it by clutch 627. Engine 602 has driving connection with sprocket 660 mounted freely upon intermediate shaft 661 and connected to it by clutch 662.

Figure 9:
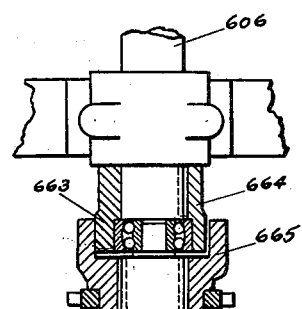
Fig. 9 is an enlarged plan view in partial section of the central, or intermediate shaft section of Fig. 6.

Shaft 661 is journalled at each end and supported in self alining bearings 663 (Fig. 9).

Figure 10:
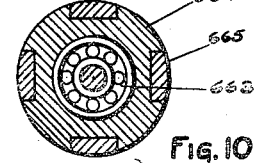
Fig. 10 is a section on plane 10—10 of Fig. 9.

Two similar clutch members 664 are keyed to the two ends of the jackshaft sections 606 and 607 and coact with sliding clutch members 665 to effect selective connection of shaft 661 with shafts 606 and 607 (Figs. 9 and 10).

Sprocket 608 (Fig. 6) is mounted freely on shaft 606 and connected to it by clutch 610 and has driving connection to a driven unit not shown but similar to driven unit 111, as shown in Fig. 1.

Sprockets 615 and 616 are mounted freely on shaft 607 and connected to it by clutches 617 and 618 and have driving connection to driven units not shown but similar to driven units 222 and 333, as in Fig. 1.

Figure 7:
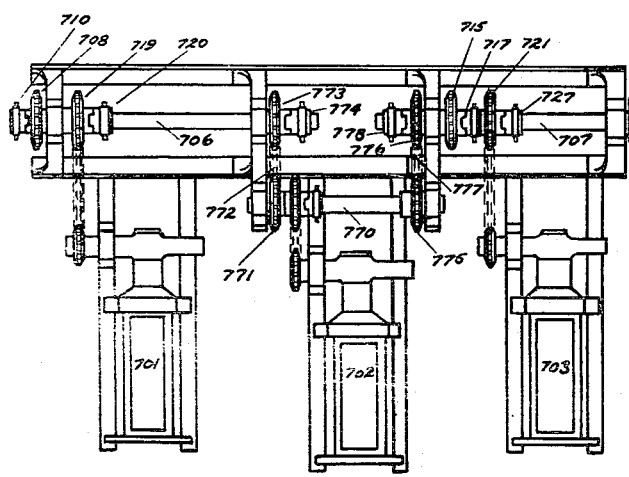
Fig. 7 shows a similar view of a three engine power plant in which the intermediate shaft is offset from the two jackshaft sections and connected therewith by chain drives.

In Fig. 7, engine 702 has driving connection to intermediate shaft 770 which is in offset relation to jackshaft sections 706 and 707 and is connected to shaft 706 by sprocket 771, chain 772, sprocket 773, and clutch 774. Sprockets 775 and 776, chain 777, and clutch 778 connect shaft 770 to shaft 707.

Engine 701 has clutch controlled driving connection with jackshaft section 706 and engine 703 has clutch controlled driving connection with jackshaft section 707, through sprocket 719, clutch 720, sprocket 721 and clutch 727.

Sprockets 708, 715, and 716 drive the driven units not shown. It is evident that the arrangement in Fig. 7 is similar to that in Fig. 6, except for the offset position of the intermediate shaft 770.

Figure 8:
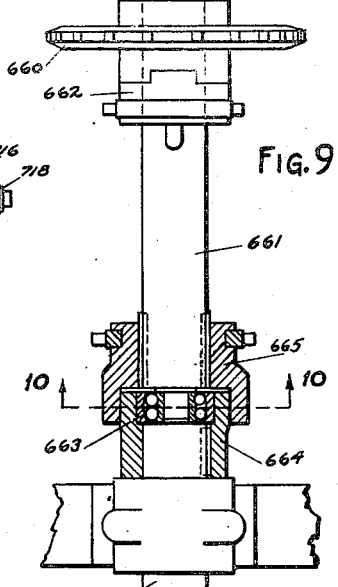
Fig. 8 shows a plan view of a three engine power plant in which each engine has its own jackshaft section which it drives, the two end sections having driving connection to the driven units and the center section having clutch controlled connection through intermediate shafts with both of the end jackshaft sections.
Figure 8:
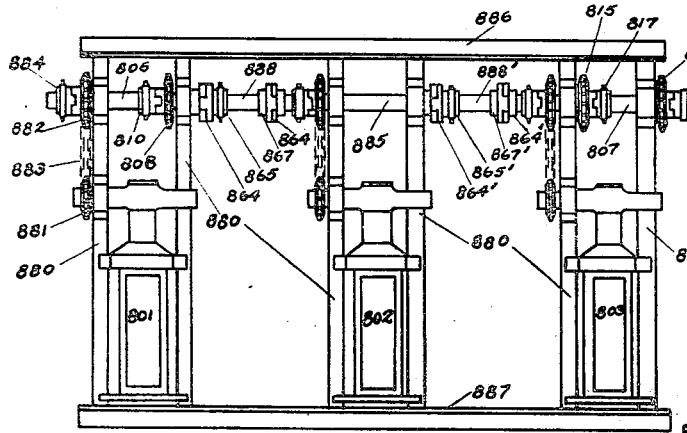

In Fig. 8, jackshaft section 806 is mounted on an extended engine base formed of horizontal elements numbered 880 and has driven connection with engine 801 through sprockets 881 and 882, chain 883 and clutch 884. Similarly, jackshaft section 807 is associated with engine 803. An intermediate jackshaft section 885 is associated in the same manner with engine 802. The engine bases and consequently the engines and jackshaft sections are located and maintained in approximate axial alinement and parallelism by the connecting members 886 and 887.

The jackshaft sections are connected by intermediate shafts 888, 888' and clutch members 864, 865 and 867, and 864', 865' and 867'. These clutches may have clearance in the jaws to allow a slight misalinement of the shafts. The sprocket 808 and clutch 810 drive unit 111 and sprockets 815 and 816 with clutches 817 and 818 drive units 222 and 333 as shown in Fig. 1, the driven units 111, 222, 333 being omitted in Fig. 8.

Fig. 9 shows in partial section the intermediate shaft as used in Fig. 6 and, with modifications, in Fig. 8. Shaft 661 is carried in self alining bearings 663 on shafts 606 and 607 to which it is connected by clutch members 664 and 665. As used in Fig. 8, only one member 665 need be slidable and sprocket 660 and clutch 662 are omitted.

Fig. 10 is a cross sectional elevation of Fig. 9 on plane 10—10.

It is evident that constructions shown in Figs. 1, 2 and 3 achieve full selectivity of driving connection, except that when both sleeves 6 and 7 are connected to drive any one of the driven units 111, 222, 333, then all active engines combine to drive that unit; the other units may be driven simultaneously, but not at a different speed. Any of the engines may be held in reserve.

In the constructions shown in Figs. 6, 7 and 8, the intermediate engines 602, 702 or 802 may be substituted for or combined with either or both of the other engines, the two outside engines may be combined to drive any or all of the driven units, any engine may be held in reserve and either jackshaft section may be driven at one speed by one or two engines, while the other section is being driven at another speed. Thus the full degree of selectivity called for in practice is achieved.

This invention is based in part on the disclosure found in Patent No. 2,171,994 for Power Plant, issued Sept. 5, 1939 to John Riise, one of the joint inventors of this application.

What we claim is:

1. In a power plant, a jackshaft having two independent sections, a prime mover having clutch controlled driving means connecting the prime mover to one of said sections, a second prime mover having clutch controlled driving means connecting said second prime mover with the other section and an additional prime mover having clutch controlled driving connections, one with each of the two sections of the jackshaft.

2. In a power plant, a jackshaft having two independent sections, a countershaft having two sections, clutch controlled driving means connecting one section of the countershaft to one section of the jackshaft and the other countershaft section to the other jackshaft section and two prime movers each having independent clutch controlled connection with either of the countershaft sections.

3. In a power plant, a jackshaft having two sections, a countershaft comprising a shaft and a sleeve mounted so as to revolve freely upon said shaft, and clutch controlled driving means connecting said shaft to one jackshaft section and the sleeve to the other jackshaft section.

4. In a power plant, a jackshaft having two sections, a countershaft comprising a shaft and a sleeve mounted to revolve freely upon said shaft, clutch controlled driving means connecting said shaft to one jackshaft section and said sleeve to the other jackshaft section, two prime movers and clutch controlled driving means for connecting each of said prime movers to either or both shaft and sleeve of said countershaft.

5. In a power plant, a jackshaft having two sections, an intermediate shaft having clutch controlled means mounted thereon connecting said intermediate shaft with said jackshaft sections, a prime mover and clutch controlled driving means mounted on said intermediate shaft connecting said intermediate shaft with said prime mover.

6. In a power plant, a jackshaft having two independent sections, a prime mover having driving connection with one section of the jackshaft, a second prime mover having driving connection with the other section of the jackshaft, a third prime mover having driving connections with both of the jackshaft sections and clutch controlled means for effecting power transmitting connection between the two jackshaft sections.

7. In a power plant, a plurality of prime movers, a jackshaft having a separate section for each of said prime movers, driving connection between each prime mover and its jackshaft section, intermediate shafts between said jackshaft sections and clutches connecting each intermediate shaft to its adjoining jackshaft sections.

8. In a power plant, a plurality of prime movers, a jackshaft section for each prime mover, clutch controlled driving means connecting each prime mover with its jackshaft section, a base upon which each prime mover and its jackshaft section are mounted in a unitary structure, means for connecting and maintaining said bases in spacing and alinement whereby said jackshaft sections are in approximate axial alinement, shafts intermediate said jackshaft sections and clutches connecting said intermediate shafts and said jackshaft sections.

9. In a power plant, a plurality of prime movers, a base for each prime mover, a jackshaft section mounted upon each of said bases, all of said jackshaft sections being in approximate axial alinement, clutch controlled driving means connecting each prime mover to its jackshaft section and clutch controlled means for effecting driving connection between said jackshaft sections.

10. In a power plant having three prime movers and two driven units, a three-part jackshaft located between said prime movers and said units and comprising an inner shaft and two sleeves rotatably mounted thereon, selective driving means for connecting through said jackshaft any one or two of said prime movers through said sleeves with either one of said units and simultaneously connecting the remaining prime mover with the other unit through said central shaft.

11. In a power plant having more than two prime movers and more than one driven unit, a three-part jackshaft located between said prime movers and said units and comprising an inner shaft and two sleeves rotatably mounted thereon, selective driving means for connecting through said jackshaft less than all of said prime movers with less than all of the driven units through said sleeves and simultaneously connecting some or all of the remaining prime movers with some or all of the remaining driven units through said central shaft.

12. In a power plant having more than two prime movers and more than one driven unit, a multipart jackshaft located between said prime movers and said units and comprising at least two end portions and an intermediate portion therebetween, selective driving means for connecting through said jackshaft any two or more of said prime movers with one or more of the driven units.

13. A power plant comprising three prime movers and a driven unit, a three-part jackshaft located therebetween, comprising a central shaft and two sleeves rotatably mounted thereon one at each end thereof, a sprocket mounted on the jackshaft between the two sleeves and having a chain drive connection with the driven unit, means for selectively connecting said sprocket with either of the two sleeves, a second sprocket mounted on one end of the jackshaft and having a chain connection with one of the prime movers, means for selectively connecting said sprocket either with the central shaft or with one of the sleeves, a third sprocket mounted towards the other end of the jackshaft and also having a chain connection with one of the prime movers, said sprocket being also selectively connected to the central shaft or to the other sleeve, a third prime mover, two sprockets mounted on the jackshaft adapted to be driven directly by the third prime mover, means for selectively connecting one of said sprockets to one of said sleeves and the other sprocket to the other sleeve.

14. A power plant including four prime movers and a plurality of driven units, a main and an intermediate jackshaft located in series between the prime movers and the driven units, the main jackshaft being directly connected with two of the prime movers, the other two prime movers being connected through the intermediate jackshaft to the main jackshaft, driven connection on said main jackshaft connected to said driven units; the intermediate jackshaft comprising a central shaft, a sleeve rotatably mounted thereon, two sprockets rotatably mounted one on each end of the jackshaft; means for selectively engaging said sprockets with either the central shaft, with the sleeve, or with both; a chain drive from each of said sprockets to one of the prime movers, a third sprocket keyed to the sleeve, a chain connecting said sprocket mounted on said main jackshaft, a fourth sprocket mounted on and driven by the central shaft, a chain connecting said fourth sprocket with a fifth sprocket on said main jackshaft; the main jackshaft comprising a central shaft and two sleeves rotatably mounted thereon, means for selectively connecting one sleeve with the third sprocket and the other sleeve with the fourth sprocket; a third prime mover, a sprocket mounted on the main jackshaft and adapted to be selectively driven by the central shaft or by one of the sleeves mounted thereon or by both, a seventh sprocket mounted on the jackshaft and adapted to be driven by the fourth prime mover and to selectively drive the central shaft, one of the sleeves, or both; an eighth sprocket mounted on said main jackshaft and adapted to be selectively driven by either of said sleeves; a ninth sprocket mounted on said jackshaft and means for driving said ninth sprocket by said central shaft.

15. In a power plant having three prime movers and a driven unit, a three-part jackshaft comprising a central portion and two end portions, three driving sprockets one mounted on each part of the jackshaft and adapted to be driven by one of said prime movers, means for selectively connecting each of said sprockets with the portion of the jackshaft upon which it is mounted, means for selectively connecting each end portion of the jackshaft with the central portion, a plurality of driven sprockets mounted on the two end portions, means for selectively connecting said driven sprockets with said end portions of said jackshaft.

FRANK D. HOWE.
JOHN RIISE.